United States Patent [19]

Back

[11] 4,105,400
[45] Aug. 8, 1978

[54] PROCESS FOR DYEING NATURAL PROTEIN FIBRES WITH METALLIC AZO DYES

[75] Inventor: Gerhard Back, Lörrach, Germany

[73] Assignee: Ciba-Geigy Corporation, Ardsley, N.Y.

[21] Appl. No.: 671,873

[22] Filed: Mar. 29, 1976

Related U.S. Application Data

[63] Continuation of Ser. No. 460,400, Apr. 12, 1974, abandoned.

[30] Foreign Application Priority Data

Apr. 17, 1973 [CH] Switzerland .................. 5498/73
Feb. 28, 1974 [CH] Switzerland .................. 2829/74

[51] Int. Cl.$^2$ .................. C09B 62/00; D06P 1/38
[52] U.S. Cl. .................. 8/43; 8/1 UA; 8/1 B; 8/2.5 R; 8/1 K; 8/42 B; 8/1 L; 8/172 R
[58] Field of Search .................. 8/43, 42 B, 1 B, 1 UA, 8/1 K, 1 L, 2.5, 41 B, 22

[56] References Cited

U.S. PATENT DOCUMENTS

| | | | |
|---|---|---|---|
| 3,114,746 | 12/1963 | Benz | 260/163 |
| 3,308,115 | 3/1967 | Benz | 260/151 |
| 3,344,131 | 9/1967 | Uehlinger | 260/146 |
| 3,516,979 | 6/1970 | Dore | 260/145 |
| 3,625,935 | 12/1971 | Back | 260/145 A |
| 3,627,747 | 12/1971 | Brouard | 260/145 A |
| 3,692,462 | 9/1972 | Back | 8/43 |
| 3,692,463 | 9/1972 | Back | 8/43 |

FOREIGN PATENT DOCUMENTS

| | | | |
|---|---|---|---|
| 945,940 | 1/1964 | United Kingdom | 8/43 |
| 947,647 | 1/1964 | United Kingdom | 8/43 |
| 1,299,277 | 12/1972 | United Kingdom | 8/41 |

*Primary Examiner*—Christopher A. Henderson, Jr.
*Attorney, Agent, or Firm*—Edward McC. Roberts; Prabodh I. Almaula

[57] ABSTRACT

The present invention relates to a process for dyeing or printing natural protein fibres in deep, black, brown, and navy blue shades, wherein protein fibres are dyed from an aqueous liquor, in the presence of a levelling agent, with a metal complex of the formula

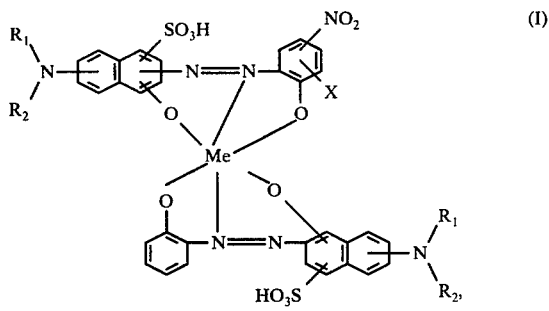

(I)

wherein $R_1$ represents hydrogen, an alkyl, aralkyl or aryl radical, $R_2$ represents an acryloyl, acetyl or a propionyl radical which is substituted by one or two halogen atoms, Me represents a chromium-III or cobalt-III ion and X represents hydrogen, nitro, chlorine, methyl, methoxy, acetylamino, chloroacetylamino or propionylamino, or the dyestuff is transferred from a support by transfer printing.

6 Claims, No Drawings

PROCESS FOR DYEING NATURAL PROTEIN FIBRES WITH METALLIC AZO DYES

This is a continuation of application Ser. No. 460,400, filed on Apr. 12, 1974 now abandoned.

An abundant range of brilliant shades has been developed for dyeing protein fibres, such as wool, with reactive dyes. However, problems have arisen in the application of dyes that produce dark shades, in particular black shades. It is possible to obtain these shades with metal complexes, especially chromium and cobalt complexes of fibre-reactive dyes. But it became apparent that metal complexes containing the reactive groups derived from aliphatic monocarboxylic acids with 2 to 4 carbon atoms and customary for wool dyes frequently yield only unsatisfactory dyeings. Above all, these dyestuffs do not build up to produce deep, black shades, and, in dyeing by the exhaustion process, the degree of exhaustion and levelness of the dyeing on the fibres often leave something to be desired.

The proposal was therefore made in British Pat. No. 1,298,851 to dye the protein fibres with reactive monoazo dyes capable of complex formation and subsequently to treat the dye on the fibres with metal donors. British Pat. No. 1,299,277 describes a further process in which a start is made from metal-free azo dyes and according to which the dyeing is effected with these dyes in the presence of a metal donor.

However, both processes possess a considerable number of disadvantages compared with the method of dyeing that comprises the use of a preformed metal complex:
- the aftertreatment prolongs the duration of the dyeing
- the process according to British Pat. No. 1,299,277 is problematical since the chromium complex should, if possible, first form on the fibre, which necessitates e.g. warming the liquor carefully and slowly in proportion to the amount of dyestuff used it is necessary to use large surpluses of chromium salts the removal of which from the effluent is desirable for ecological reasons but is very difficult.
- the final shade becomes apparent only at the conclusion of the dyeing process and corrections thereof are therefore difficult.

The present invention is based on the observation that a narrow range of reactive metal complexes, namely those of the formula I indicated hereinbelow, build up to yield deep shades along with good fastness propterties also as ready-formed metal complexes and by employing the conventional dyeing processes.

The invention therefore provides a process for dyeing natural protein fibres with fibre-reactive dyes, wherein protein fibres are dyed in the presence of a levelling agent from an aqueous liquor with a metal complex of the formula

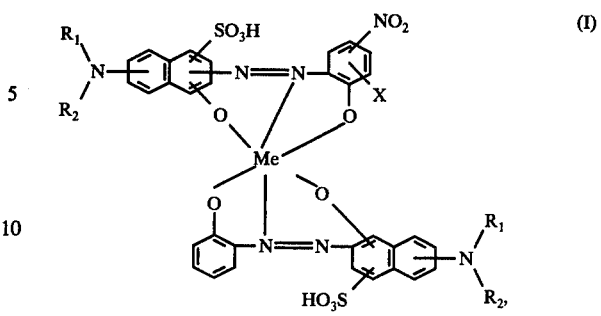

wherein $R_1$ represents hydrogen, an alkyl, aralkyl or aryl radical, $R_2$ represents an acryloyl, acetyl or propionyl radical which is substituted by one or two halogen atoms, Me represents a chromium-III or cobalt-III ion and X represents hydrogen, nitro, chlorine, methyl, methoxy, acetylamino, chloroacetylamino or propionylamino, or the dye is transferred from a support by transfer printing accompanied by a heat treatment.

The following radicals are examples of suitable reactive groups:
chloroacetyl
β-chloropropionyl
β-bromopropionyl
α-chloroacryloyl
β-chloroacryloyl
α,β-dichloropropionyl
β-bromoacryloyl and
α,β-dibromopropionyl.

The complexes that can be used according to the invention are manufactured by using azo dyes, which are obtained e.g. from the following diazo and coupling components:

Diazo Components
1-hydroxy-2-amino-4-nitrobenzene
1-hydroxy-2-amino-5-nitrobenzene
1-hydroxy-2-amino-4,6-dinitrobenzene
1-hydroxy-2-amino-4-nitro-6-acetylaminobenzene
1-hydroxy-2-amino-4-chloro-5-nitrobenzene
-hydroxy-2-amino-4-methyl-5-nitrobenzene
1-hydroxy-2-amino-4-methoxy-5-nitrobenzene
1-hydroxy-2-amino-4-nitro-6-propionyl-aminobenzene
1-hydroxy-2-amino-4-nitro-6-chloroacetylaminobenzene.

Coupling Components
1-hydroxy-7-aminonaphthalene-3-sulphonic acid
1-hydroxy-7-N-methylaminonaphthalene-3-sulphonic acid
1-hydroxy-7-N-benzylaminonaphthalene-3-sulphonic acid
1-hydroxy-7-N-phenylaminonaphthalene-3-sulphonic acid
1-hydroxy-6-N-methylaminonaphthalene-3-sulphonic acid
1-hydroxy-6-aminonaphthalene-3-sulphonic acid
1-hydroxy-8-aminonaphthalene-4-sulphonic acid
2-hydroxy-6-aminonaphthalene-4-sulphonic acid
1-hydroxy-7-aminonaphthalene-4-sulphonic acid
1-hydroxy-5-aminonaphthalene-3-sulphonic acid.

On account of their easy accessibility and the neutral black shade obtainable therewith, particular interest attaches to the dyes that are derived from 1-hydroxy-2 amino-4-nitrobenzene or 1-hydroxy-2-amino-5-nitrobenzene as diazo components, and from 1-hydroxy-7-aminonaphthalene-3-sulphonic acid or 1-hydroxy-6-aminonaphthalene-3-sulphonic acid as coupling component.

The metal complexes are manufactured by methods that are known per se by diazotisation, coupling, metallising, and acylation. These reaction steps can be carried out in varying sequence since the acylation can be effected both already at the coupling component and at the azo dye, i.e. after the coupling, or especially at the ready-formed metal complex, i.e. as final step.

As acylating agents there are used the acid anhydrides and, in particular, acid chlorides, of the acids corresponding to the acid radicals cited hereinbefore.

The conversion of the monoazo dyes into the 1:2 chromium or 1:2 cobalt complexes is carried out with the customary metal donors, the ratio of metal atoms to molecules of monoazo dye being 1:2. The metallising is carried out in a slightly acid to alkaline medium. For this reason there are used advantageously metal compounds that are stable under these pH conditions and form no sparingly soluble salts, e.g. chromium complexes of aliphatic dicarboxylic acids or hydroxycarboxylic acids or of aromatic hydroxycarboxylic acids (e.g. oxalic acid, lactic acid, glycolic acid, citric acid and, in particular, tartaric acid or salicylic acid). The cobalting can be carried out with cobalt sulphate, cobalt acetate, or freshly precipitated cobalt hydroxide. For practical reasons the metallisation is effected in aqueous solution, optionally accompanied by the addition of organic solvents such as alcohols or dimethyl formamide, or else in purely organic solvents, e.g. in alcohol, glycols, glycol ethers or esters, glycerol, or ketones.

According to a preferred embodiment of the invention, the dyes are applied by transfer printing in a wet contact method. For this purpose, a support, usually paper, is printed in the conventional manner with an ink containing a chromium complex dye of the formula (I). The textile material to be printed is brought into contact in the moist state with the printed support and heated. Suitable processes are described e.g. in British Pat. Nos. 1,227,271 and 1,284,824. It is expedient to impregnate the textile material with an aqueous preparation that contains a thickener and a weak acid.

A further preferred method of dyeing is the cold pad-batch method. This consists in impregnating the textile material with an aqueous dyestuff preparation and then storing it in the wet state. In addition to the customary thickeners, the dyestuff preparation contains a levelling agent and a weak acid.

In additon, the dyestuffs can be dyed successfully by the exhaustion process from an acid, aqueous bath. A good degree of exhaustion and level and deep dyeings are obtained. The pH should be between 4.5 and about 6.5, which is best attained by adding ammonium sulphate and acetic acid. The dyeing is performed at about 80° to 110° C in the presence of suitable levelling agents. Good wet fastness properties are obtained by neutralisation at the conclusion of the dyeing process with a base, appropriately with ammonia, in order to remove any amounts of dye not fixed to the fibres. This is done at 80° C and a pH of 8.0 to 8.5. Afterwards, the goods are dried and, if desired, acidified.

As levelling agents it is possible to use both non-ionic and ionic, i.e. anionic and cationic, nitrogen-containing compounds in the process according to the invention.

It is advantageous to use polyglycol ether derivatives of long-chain monoamines or diamines wherein at least one nitrogen atom is substituted by the hydrocarbon radical of a long-chain fatty acid; moreover, these adducts can also be quaternised at one nitrogen atom or esterified at the end of a polyglycol chain with a polybasic acid, or they can be both quaternised and esterified.

As starting materials there are used homogeneous alkylamines of higher molecular weight or also mixtures of amines, such as are obtained in the conversion of natural fatty acid mixtures, e.g. stearic acid, into the corresponding amines. Suitable amines are those with 16 to 22 carbon atoms to which at least 5 to 10, and not more than 60 to 70, moles of ethylene oxide are additively combined. As individual amines there may be cited: hexadecylamine, octadecylamine, arachidylamine $CH_3(CH_2)_{19}—NH_2$, behenylamine $CH_3(CH_2)_{21}—NH_2$, octadecylamine and N-alkylpropylenediamine with the appropriate hydrocarbon radicals.

Both the quaternisation and the esterification of the nitrogen-containing polyglycol ether derivatives are advantageously carried out by known methods without any precipitation being first required.

Conventional alkylating or aralkylating agents, e.g. dimethyl sulphate, ethyl bromide, or benzyl chloride, can be used for the quaternisation. However, preferred quaternising agents are chloroacetamide, ethylene chlorohydrin, ethylene bromohydrin, epichlorohydrin or epibromohydrin.

As polybasic oxyacids for the formation of the acid esters it is possible to use organic polycarboxylic acids, e.g. maleic acid or polybasic inorganic oxyacids, such as phosphoric acid or sulphuric acid. Instead of the acids it is possible to use the functional derivatives thereof, e.g. acid anhydrides, acid halides, acid esters or acid amides. According to a particularly preferred embodiment, the acid sulphuric acid esters are manufactured direct in the form of their ammonium salts by heating the starting materials in the presence of urea with amidosulphonic acid. Both the quaternisation and the partial esterification are carried out by straightforward mixing of the reactants accompanied by heating, advantageously to a temperature between 50° and 100° C.

As particularly advantageous levelling agents there may be cited: the addition product of oleylamine and 8 moles of ethylene oxide and the mixture consisting of (a) an adduct of 1 mole of stearic amine (consisting of 30% hexadecylamine, 25% octadecylamine, and 45% octadecenylamine) and 7 moles of ethylene oxide, quaternised with chloroacetamide, and (b) the ammonium salt of the acid sulphuric acid ester of the same, non-quaternary adduct, as well as the individual components (a) and (b) of the cited mixture.

The amount of levelling agent in the dye baths is about 0.5 to 2% of the weight of the fibre, depending on the amount of dye used.

Further additives that the dyebath or the padding liquor can contain are, for example, thickeners, salts and acids. The thickeners must be stable in acid medium and also must not be destroyed by the presence of a metal donor. Examples of such thickeners are British gum or also etherified carubic acids. As salts there are used advantageously sodium sulphate, ammonium sulphate, sodium chloride, or primary and secondary phosphates, and as acids, aliphatic monocarboxylic or dicarboxylic acids that contain in the aliphatic chain at most 4 carbon atoms in addition to the carboxy carbon atom. However, only the aliphatic monocarboxylic acids, e.g. formic or acetic acid, are of practical importance. The amount of acid in the dyebath is 2 to 8% of the fibre weight, depending on the amount and type of dye used.

Natural nitrogen-containing fibres can be dyed by the present process. Silk and above all wool may be mentioned. The fibre material can be in any desired state of processing. However, particularly good results are obtained in dyeing unwoven wool, such as loose wool, tops, or yarn, but also fabrics made from the cited fibre materials are dyed with good results.

Chiefly dark shades, such as navy blue or black, are obtained by the present process.

The following Examples describe the invention, the parts and percentages being by weight unless otherwise stated.

EXAMPLE 1

The following ingredients are dissolved successively in 4000 parts of water of 50° C: 4 parts of 80% acetic acid, 2 parts of the ammonium salt of the acid sulphuric acid ester of the adduct of a fatty amine (consisting of 30% hexadecylamine, 25% octadecylamine and 45% octadecenylamine), and 4 parts of ammonium sulphate.

To this dyebath is added a solution of 8 parts of the dyestuff manufactured by known methods of the constitution

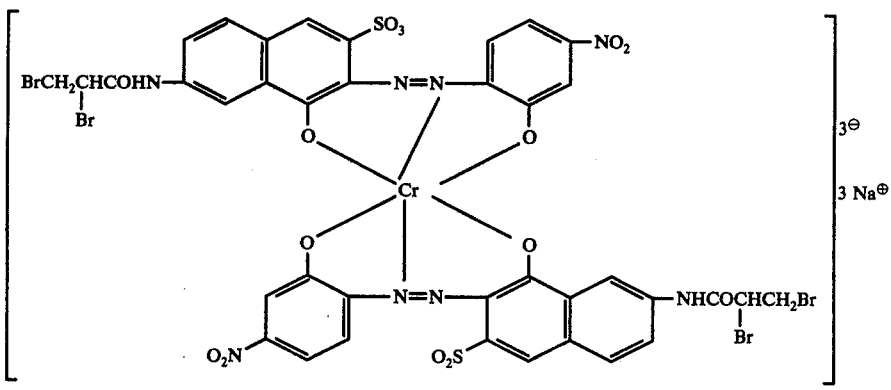

in 100 parts of hot water. Then 100 parts of wetted wool yarn is put into the bath and the temperature of the bath is raised from 50° to 80° C over the course of 30 minutes. Dyeing is carried out for 20 minutes at 80° C, then the bath is heated to the boil and dyeing is subsequently performed for 90 minutes at the boil. The dye exhausts almost completely on to the substrate. The bath is cooled to 80° C and the pH is increased from about 4.5 to a constant 8.5 by addition of ammonia solution. The goods are subjected to an aftertreatment at 80° C, in the process of which a small amount of nonfixed dye is removed. The material is thoroughly rinsed with hot and cold water, acidified with 1 part of 80% formic acid, centrifuged and dried to give a wool yarn which is dyed a deep bluish-black shade of very good fastness to wet treatments and rubbing and of excellent light fastness. A level, full, black dyeing of very good fastness properties is obtained by using 8 parts of the dye listed in the subsequent Table as Example 3 instead of the cited dye and otherwise carrying out the same procedure.

EXAMPLE 2

In a pressure dyeing apparatus a dyebath is prepared from 1000 parts of water of 50° C, 3 parts of 80% acetic acid, 1 part of the adduct of stearic amine and 7 moles of ethylene oxide (quaternised with chloroacetamide and esterified with amidosulphonic acid/urea to give the ammonium salt of the acid sulphuric acid ester of the quaternised adduct), and 6 parts of the dye obtained by conventional methods of the following constitution

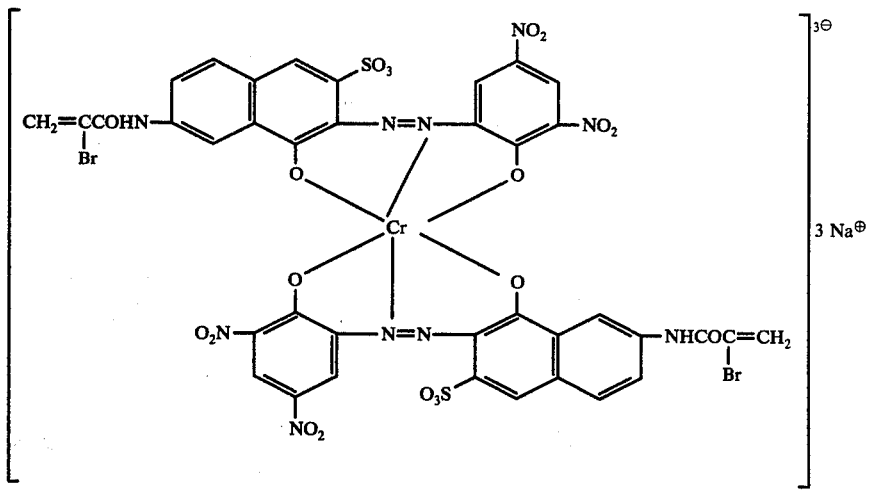

After 100 parts of wool fabric have been put into this dyebath, the apparatus is sealed so as to be resistant to pressure, and the temperature is raised from 50° to 106° C over the course of 30 minutes and kept for a further 60 minutes at 106° C. After cooling the bath to 80° C, the pressure sealing is released, and the dyebath is adjusted with ammonia solution to pH 8.5 and kept for 20 minutes at 80° C. The dyeing is subsequently finished as in Example 1. The wool fabric is dyed in a level, greenish-black shade of very good general fastness properties.

The following Table contains in column I diazotisation components, in column II coupling components, in column III acylating agents, and in column IV complexed metals. The combination of these elements yields dyes having a constitution analogous to that of the dye of Example 1 or 2. The shades obtained by the same dyeing method are indicated in column V of the table.

ture. The material is rinsed with cold water and then treated in a fresh bath with sufficient 24% ammonia to establish and maintain a pH of 8.5 for 15 minutes at 80° C. The fabric is rinsed in warm water, then finally acidified with 80% acetic acid and dried. The wool fabric is dyed in a slightly reddish, full black shade of excellent fastness properties.

EXAMPLE 4

A wool fabric is impregnated with the following preparation and squeezed out on a padder to a moisture pick-up of 250%:

| No. | I | II | III | IV | V |
|---|---|---|---|---|---|
| 1 | 1-hydroxy-2-amino-4-nitrobenzene | 1-hydroxy-7-amino-naphthalene-3-sulphonic acid | chloroacetic-chloride | chromium | black |
| 2 | " | " | $\alpha,\beta$-dibromopropionic chloride | cobalt | dark brown |
| 3 | " | " | " | chromium | black |
| 4 | 1-hydroxy-2-amino-5-nitrobenzene | " | $\alpha$-chloroacrylic chloride | chromium | bluish black |
| 5 | 1-hydroxy-2-amino-4-nitro-6-acetyl-aminobenzene | " | $\alpha$-bromoacrylic chloride | chromium | violet black |
| 6 | 1-hydroxy-2-amino-4-nitrobenzene | 1-hydroxy-6-amino-naphthalene-3-sulphonic acid | $\alpha,\beta$-dibromopropionic chloride | chromium | violet black |
| 7 | 1-hydroxy-2-amino-benzene | " | " | cobalt | navy blue |
| 8 | 1-hydroxy-2-amino-4,6-dinitrobenzene | 2-hydroxy-6-amino-naphthalene-4-sulphonic acid | $\alpha,\beta$-dichloropropionic chloride | chromium | black |
| 9 | 1-hydroxy-2-amino-4,6-dinitrobenzene | 1-hydroxy-5-amino-naphthalene-3-sulphonic acid | $\alpha,\beta$-dichloropropionic chloride | chromium | violet black |
| 10 | 1-hydroxy-2-amino-4-nitrobenzene | 1-hydroxy-7-amino-naphthalene-4-sulphonic acid | $\alpha,\beta$-dibromopropionic chloride | chromium | blackish violet |
| 11 | " | " | " | cobalt | dark brown |
| 12 | 1-hydroxy-2-amino-5-nitrobenzene | 1-hydroxy-8-amino-naphthalene-5-sulphonic acid | " | chromium | greyish blue |
| 13 | 1-hydroxy-2-amino-4-chloro-5-nitro-benzene | " | " | cobalt | dark blue |
| 14 | 1-hydroxy-2-amino-4-nitrobenzene | 1-hydroxy-7-methyl-aminonaphthalene-3-sulphonic acid | chloroacetic chloride | chromium | black |
| 15 | 1-hydroxy-2-amino-4-nitro-6-chloro-acetylaminobenzene | " | " | chromium | violet black |
| 16 | " | 1-hydroxy-6-methyl-aminonaphthalene-3-sulphonic acid | $\alpha,\beta$-dibromopropionic chloride | chromium | dark violet |
| 17 | 1-hydroxy-2-amino-4-methoxy-5-nitro-benzene | 1-hydroxy-6-methyl-aminonaphthalene-3-sulphonic acid | chloroacetic chloride | chromium | dark bluish grey |
| 18 | " | " | " | cobalt violet | greyish |

EXAMPLE 3

Wool flannel is impregnated on a padder with the following dyestuff preparation and squeezed out to a pick-up of 100%.

```
 50 parts of the dye No. 3 of the Table
300 parts of urea
320 parts of Solvitose (OFA 4% (thickener)
 10 parts of a mixture of anionic fatty alcohol ether sul-
    phate with non-ionogenic wetting agents
 10 parts of the levelling agent used in Example 2
 10 parts of sodium metabisulphite
 10 parts of 80% acetic acid
280 parts of water
1000 parts of padding liquor.
```

The impregnated fabric, rolled up and packed air-tight, is subsequently stored for 48 hours at room tempera-

```
 4   parts of Diaprint REG (acid resistant thickener)
 1   part of sulphamic acid
 0.2 part of thymol
 0.2 part of emulsifier
94.6 parts of water
100.0 parts
```

The impregnated material is subsequently pressed together with a transfer paper bearing a printed pattern applied in the conventional manner, of the dye listed as No. 3 in the Table, in a heatable press for 3 minutes at 100° to 105° C and under a pressure of about 0.5 kg/cm². The wool fabric is rinsed and dried to give a corresponding deep black printed pattern having very good fastness properties.

I claim:

1. A process for dyeing or printing natural protein fibers in deep shades of black, brown or navy blue, comprising the step of applying to the natural protein fibers an aqueous liquor containing a levelling agent and a dye of the formula

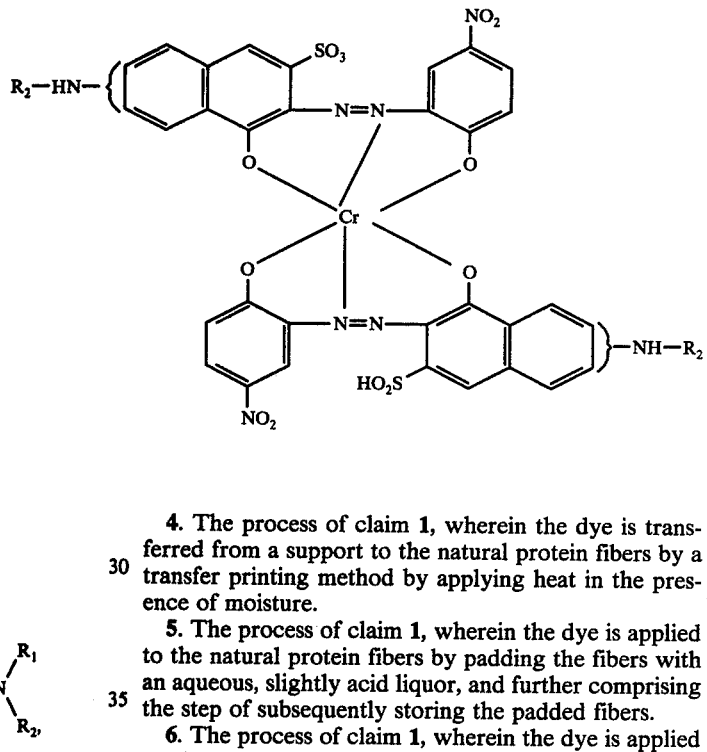

wherein $R_1$ is hydrogen or methyl, $R_2$ is dibromopropionyl, dichloropropionyl, alpha-bromoacryloyl, alpha-chloroacryloyl or chloroacetyl, and X is hydrogen, nitro, chlorine, methoxy, acetylamino or chloroacetylamino.

2. The process of claim 1, wherein $R_1$ is H and $R_2$ is an α-bromoacryloyl or a dibromopropionyl radical.

3. The process of claim 2, wherein the dye is of the formula

4. The process of claim 1, wherein the dye is transferred from a support to the natural protein fibers by a transfer printing method by applying heat in the presence of moisture.

5. The process of claim 1, wherein the dye is applied to the natural protein fibers by padding the fibers with an aqueous, slightly acid liquor, and further comprising the step of subsequently storing the padded fibers.

6. The process of claim 1, wherein the dye is applied to the natural protein fibers by exhaustion from the aqueous liquor.

* * * * *

UNITED STATES PATENT AND TRADEMARK OFFICE
CERTIFICATE OF CORRECTION

PATENT NO. : 4,105,400
DATED : August 8, 1978
INVENTOR(S) : Gerhard Back

It is certified that error appears in the above-identified patent and that said Letters Patent are hereby corrected as shown below:

Claim 3, column 10, upper middle of the chemical structure "$SO_3$" should be -- $SO_3H$ --.

Claim 3, column 10, lower middle of the chemical structure "$HO_2S$" -should be -- $HO_3S$ --.

Signed and Sealed this

Nineteenth Day of June 1979

[SEAL]

Attest:

RUTH C. MASON
Attesting Officer

DONALD W. BANNER
Commissioner of Patents and Trademarks